US012579804B2

(12) United States Patent
Kwak et al.

(10) Patent No.: US 12,579,804 B2
(45) Date of Patent: Mar. 17, 2026

(54) METHOD AND DEVICE FOR LEARNING FOG-INVARIANT FEATURE

(71) Applicant: POSTECH RESEARCH AND BUSINESS DEVELOPMENT FOUNDATION, Pohang-si (KR)

(72) Inventors: Suha Kwak, Pohang-si (KR); Taeyoung Son, Pohang-si (KR); Sohyun Lee, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 282 days.

(21) Appl. No.: 18/338,760

(22) Filed: Jun. 21, 2023

(65) Prior Publication Data

US 2023/0419654 A1     Dec. 28, 2023

(30) Foreign Application Priority Data

Jun. 22, 2022  (KR) ........................ 10-2022-0076456
May 4, 2023  (KR) ........................ 10-2023-0058557

(51) Int. Cl.
*G06V 20/10*      (2022.01)
*G06V 10/26*      (2022.01)
*G06V 10/44*      (2022.01)

(52) U.S. Cl.
CPC .............. *G06V 20/10* (2022.01); *G06V 10/26* (2022.01); *G06V 10/443* (2022.01)

(58) Field of Classification Search
CPC ....... G06V 20/10; G06V 10/443; G06V 10/26
See application file for complete search history.

(56) References Cited

FOREIGN PATENT DOCUMENTS

| KR | 10-2021-0030573 A | 3/2021 |
| KR | 10-2022-0079477 A | 6/2022 |

OTHER PUBLICATIONS

Yan, W., Sharma, A., & Tan, R. T. (2020). Optical flow in dense foggy scenes using semi-supervised learning. In Proceedings of the IEEE/CVF Conference on Computer Vision and Pattern Recognition (pp. 13259-13268). (Year: 2020).*

Liao, L., Chen, W., Xiao, J., Wang, Z., Lin, C. W., & Satoh, S. I. (2022). Unsupervised foggy scene understanding via self spatial-temporal label diffusion. IEEE Transactions on Image Processing, 31, 3525-3540. (Year: 2022).*

Sakaridis, C., Dai, D., Hecker, S., & Van Gool, L. (2018). Model adaptation with synthetic and real data for semantic dense foggy scene understanding. In Proceedings of the european conference on computer vision (ECCV) (pp. 687-704). (Year: 2018).*

(Continued)

*Primary Examiner* — David Perlman
(74) *Attorney, Agent, or Firm* — Sughru Mion, PLLC

(57) ABSTRACT

A device for learning a fog-invariant feature includes a fog-pass filter, which is trained such that fog factors of the same fog domain approach each other and fog factors of different fog domains are apart from each other so as to determine a fog state of an input image as a fog factor, and a segmentation network, which is trained such that a fog style gap between the different fog domains decreases, in which training of the fog-pass filter and training of the segmentation network are alternatively performed by using three fog domain datasets.

15 Claims, 4 Drawing Sheets

(56) References Cited

OTHER PUBLICATIONS

Ma, X., Wang, Z., Zhan, Y., Zheng, Y., Wang, Z., Dai, D., & Lin, C. W. (2022). Both style and fog matter: Cumulative domain adaptation for semantic foggy scene understanding. In Proceedings of the IEEE/CVF conference on computer vision and pattern recognition (pp. 18922-18931). (Year: 2022).*

Sohyun Lee, et al., "FIFO: Leaming Fog-invariant Features for Foggy Scene Segmentation", CVF—The Computer Vision Foundation, Published Jun. 24, 2022, pp. 18911-18921.

Yiheng Zhang et al., "Fully Convolutional Adaptation Networks for Semantic Segmentation", IEEE, Jun. 18, 2018, pp. 6810-6818 (9 pages).

Korean Office Action dated Jun. 23, 2025 in Application No. 10-2023-0058557.

Chinese Office Action dated Jul. 9, 2025 in Application No. 202310750950.5.

* cited by examiner 301          302          303

△ Clear Weather     ⊘ Synthetic Fog     ◇ Real Fog (FZ v2)

Gram matrices (310)          Fog factors (320)

FIG. 4

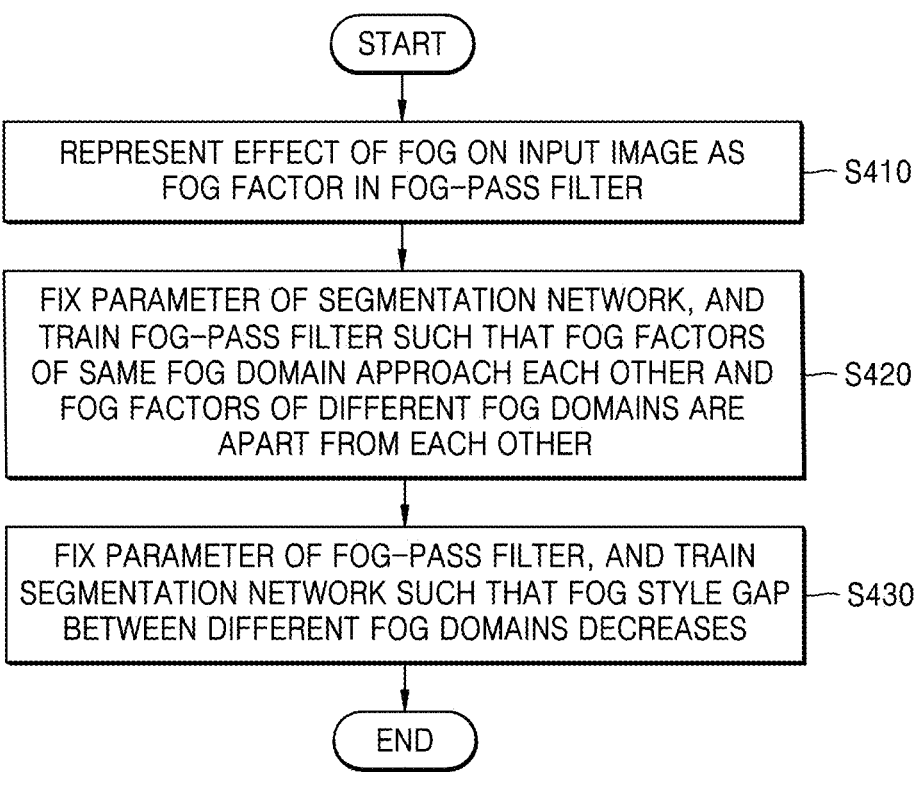

START

REPRESENT EFFECT OF FOG ON INPUT IMAGE AS
FOG FACTOR IN FOG-PASS FILTER — S410

FIX PARAMETER OF SEGMENTATION NETWORK, AND
TRAIN FOG-PASS FILTER SUCH THAT FOG FACTORS
OF SAME FOG DOMAIN APPROACH EACH OTHER AND — S420
FOG FACTORS OF DIFFERENT FOG DOMAINS ARE
APART FROM EACH OTHER

FIX PARAMETER OF FOG-PASS FILTER, AND TRAIN
SEGMENTATION NETWORK SUCH THAT FOG STYLE GAP — S430
BETWEEN DIFFERENT FOG DOMAINS DECREASES

END

METHOD AND DEVICE FOR LEARNING FOG-INVARIANT FEATURE

CROSS-REFERENCE TO RELATED APPLICATIONS

This application claims the benefits of Korean Patent Application No. 10-2022-0076456, filed on Jun. 22, 2022, in the Korean Intellectual Property Office, and Korean Patent Application No. 10-2023-0058557, filed on May 4, 2023, in the Korean Intellectual Property Office, the disclosures of which are incorporated herein in their entirety by reference.

BACKGROUND

1. Field

The disclosure relates to a method and device for learning a fog-invariant feature to accurately recognize a foggy scene. This research was supported by the Samsung Future Technology Development Program (Project No.: SRFC-IT1801-05).

2. Description of the Related Art

It is not easy to recognize foggy scenes because foggy images severely impair visibility. Furthermore, foggy scenes are difficult to collect because they can only be taken under specific conditions, and annotation is difficult because visibility is limited due to fog.

Due to this problem, in order to recognize foggy scenes, deep learning has been performed using a synthetic fog dataset in which a fog effect is applied to annotated clear weather images.

However, when a neural network is trained using the synthetic fog dataset, the neural network is trained to be biased toward the fog scene so that image recognition in clear weather is deteriorated.

PRIOR ART DOCUMENT

Patent Literature

KR 10-2021-0171677

SUMMARY

Provided is a method and device for learning a fog-invariant feature, in which training performed such that a fog condition in an input image is considered as a style independent of the content of the input image in a segmentation network. Through this, the segmentation network learns a feature that is invariant to fog in an input image.

According to an aspect of the disclosure, a device for learning a fog-invariant feature includes a fog-pass filter, which is trained such that fog factors of the same fog domain approach each other and fog factors of different fog domains are apart from each other so as to determine a fog condition of an input image as a fog factor, and a segmentation network, which is trained such that a fog style gap between the different fog domains decreases, in which training of the fog-pass filter and training of the segmentation network are alternatively performed by using three fog domain datasets.

In an embodiment, the three fog domains may include a clear weather domain, a synthetic fog domain, and a real fog domain, and the clear weather domain and the synthetic fog domain are each labeled, and the real fog domain may be unlabeled.

In an embodiment, a parameter of the segmentation network may be fixed when training the fog-pass filter, and parameters of the fog-pass filter may be fixed when training the segmentation network.

In an embodiment, the fog-pass filter may be connected to the segmentation network and may receive Gram matrix of a feature map of a segmentation network as an input.

In an embodiment, the fog factor may denote a value that represents, in a real number vector, an effect of fog in style information extracted from the input image, and the style information extracted from the input image may be represented as Gram matrix of a feature map.

In an embodiment, the Gram matrix of the feature map of the segmentation network may include Gram matrix of the clear weather domain, Gram matrix of the synthetic fog domain, and Gram matrix of the real fog domain.

In an embodiment, the segmentation network may be trained for a training image pair of (clear weather image, synthetic fog image) based on a segmentation loss that calculates a predicted value close to a correct answer, a fog style matching loss that may be calculated such that fog conditions of training images obtained in different fog conditions are undistinguishable, and a prediction consistency loss that may be calculated to derive similar inferred values for a training image pair having an image recognition correct answer.

In an embodiment, the segmentation network may be trained for a training image pair of (clear weather image, real fog image) and a training image pair of (real fog image, synthetic fog image) based on a segmentation loss that calculates a predicted value close to a correct answer of a domain selected from among a clear weather domain and a synthetic fog domain, and a fog style matching loss that may be calculated such that fog conditions of a training image obtained from the selected domain and a training image obtained from the real fog domain are undistinguishable.

According to another aspect of the disclosure, a method of learning a fog-invariant feature includes representing an effect of fog on an input image as a fog factor in a fog-pass filter connected to a segmentation network and receiving, as an input, Gram matrix of a feature map of the segmentation network, determining a fog condition of the input image as a fog factor by fixing a parameter of the segmentation network and training, in the fog-pass filter, such that fog factors of the same fog domain approach each other and fog factors of different fog domains are apart from each other, and fixing the parameter of the fog-pass filter, and training, in the segmentation network, such that a fog style gap between different fog domains decreases, wherein training of the fog-pass filter and training of the segmentation network are alternatively performed.

In an embodiment, the segmentation network may be trained based on a segmentation loss that calculates a predicted value close to a correct answer, and further trained based on at least one of a fog style matching loss that may be calculated such that fog conditions of training images obtained in different fog conditions are undistinguishable, or a prediction consistency loss that may be calculated to derive similar inferred values for a training image pair having an image recognition correct answer

BRIEF DESCRIPTION OF THE DRAWINGS

These and/or other aspects will become apparent and more readily appreciated from the following description of the embodiments, taken in conjunction with the accompanying drawings in which:

FIG. 4 is a flowchart of a method of learning a fog-invariant feature, according to an embodiment.

DETAILED DESCRIPTION

Figure 1:
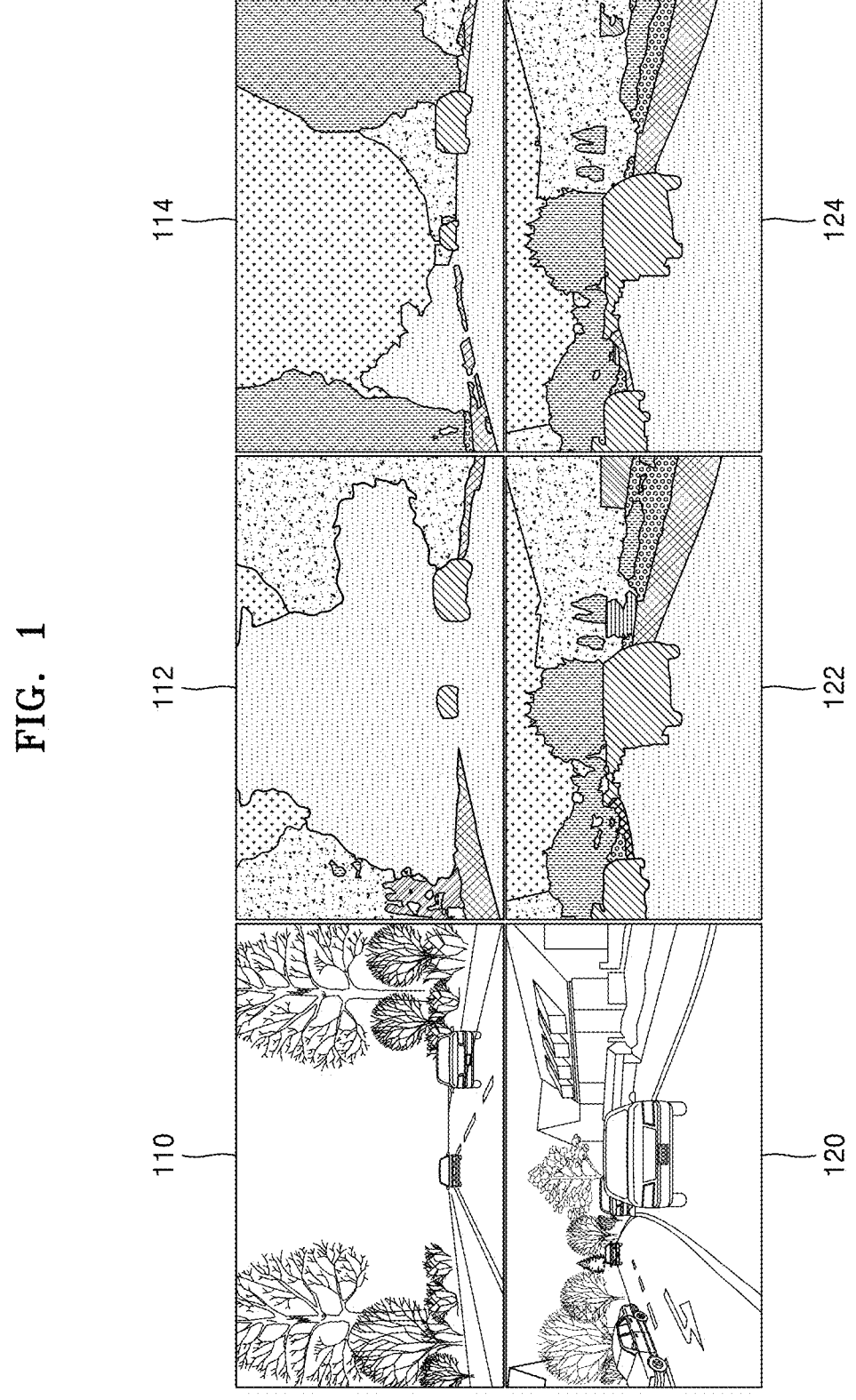
FIG. 1 illustrates an example in which image recognition is performed on an image captured in clear weather and an image captured in real foggy weather in a segmentation network according to the related art and in a segmentation network according to the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an example in which image recognition is performed on an image 120 captured in clear weather and an image 110 captured in real foggy weather in a segmentation network according to the related art and in a segmentation network according to the disclosure.

For the image 120 captured in clear weather, it is confirmed that both of a result image 122 of recognizing an image in a segmentation network trained by an existing method and a result image 124 of recognizing an image in a segmentation network trained by a method according to the disclosure have high accuracy.

Unlike the above, for the image 110 captured in real foggy weather, it is confirmed that the result image 122 of recognizing an image in a segmentation network trained by the existing method has low accuracy. In contrast, the result image 124 of recognizing an image in a segmentation network according to the disclosure, which has learned a fog-invariant feature, is relatively accurate.

Figure 2:
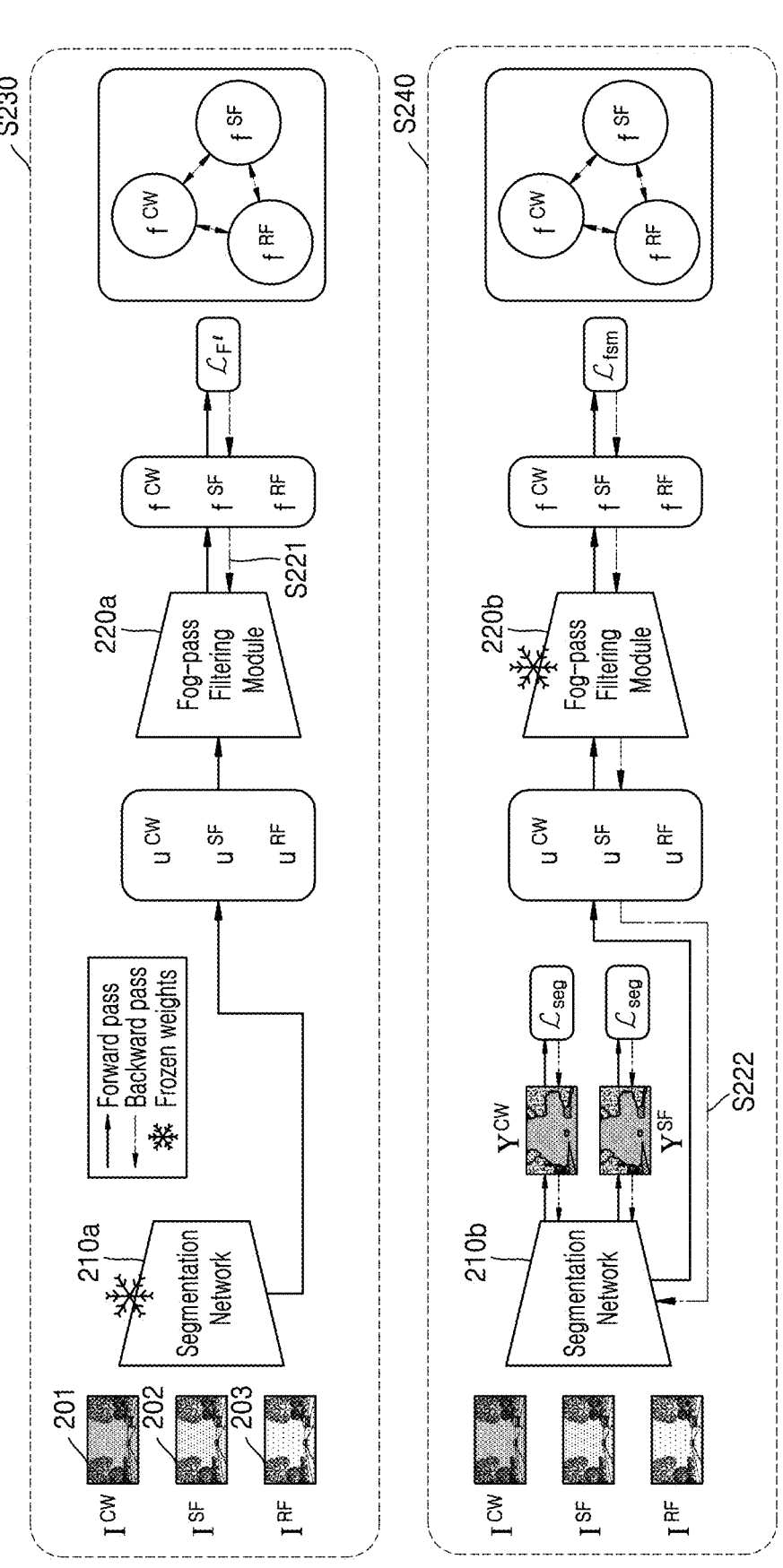
FIG. 2 is a diagram of the internal structure of a device for learning a fog-invariant feature, according to an embodiment.

FIG. 2 is a diagram of the internal structure of a device 200 for learning a fog-invariant feature, according to an embodiment.

In an embodiment, the device 200 for learning a fog-invariant feature may be implemented in the form of a personal computer (PC), a computer, a notebook computer, a handheld device, a wearable device, a tablet computer, a handphone, a smartphone, a smartwatch, and the like.

In an embodiment, the device 200 for learning a fog-invariant feature includes segmentation networks 210a and 210b and fog-pass filters 220a and 220b.

The device 200 for learning a fog-invariant feature alternately performs training on the segmentation networks 210a and 210b and the fog-pass filters 220a and 220b, by using three fog domain datasets 201, 202, and 203 (S230 and S240). Through the optimization operations (S230 and S240) of alternately performing training of the segmentation networks 210a and 210b and the fog-pass filters 220a and

220b, a fog style gap between different fog domains decreases, and thus, the segmentation network may learn a fog-invariant feature.

A method of learning a fog-invariant feature is described as follows.

In an embodiment, it is assumed that the segmentation networks 210a and 210b are previously trained with respect to a clear weather dataset 201. Also, it is assumed that the fog-pass filters 220a and 220b are used to learn a fog-invariant feature in the segmentation networks 210a and 210b.

The device 200 for learning a fog-invariant feature uses the three fog domain datasets 201, 202, and 203. The three fog domain datasets 201, 202, and 203 include a clear weather domain $I^{CW}$ 201, a synthetic fog domain $I^{SR}$ 202, and a real fog domain $I^{RF}$ 203. In an embodiment, the clear weather domain $I^{CW}$ 201 and the synthetic fog domain $I^{SR}$ 202 are each labeled, whereas the real fog domain $I^{RF}$ 203 is unlabeled.

The device 200 for learning a fog-invariant feature connects the fog-pass filters 220a and 220b to the segmentation networks 210a and 210b. The fog-pass filters 220a and 220b receive, as inputs, Gram matrix of a feature map of the segmentation networks 210a and 210b. The fog-pass filters 220a and 220b consider Gram matrices $u^{CW}$, $u^{RF}$ and $u^{RF}$ of the feature map as style information of an input image. Referring to FIG. 2, the fog-pass filters 220a and 220b receive, as inputs, Gram matrices $u^{CW}$, $u^{RF}$ and $u^{RF}$ for a feature map with respect to the three fog domains 201, 202, and 203.

First, when the fog-pass filter 220a is trained in the device 200 for learning a fog-invariant feature (S230), a parameter of the segmentation network 210a is fixed. In this case, a parameter of the segmentation network 210a is not trained. Accordingly, when training the fog-pass filter 220a (S230), a loss function $\mathcal{L}_{fg}$ of a fog-pass filter in Equation 1 is transferred to the fog-pass filter 220a only in a backward direction (S221).

The fog-pass filter 220a is trained to learn to draw fog factors of the same fog domain together, and hold those of different fog domains apart To this end, the fog-pass filter 220a separate fog factors $f^{CW}$, $f^{SF}$, and $f^{RF}$ from the Gram matrices $u^{CW}$, $u^{RF}$ and $u^{RF}$ of the input feature map. The fog factors $f^{CW}$, $f^{SF}$, and $f^{RF}$ denote values that represent, in real number vectors, the effect of fog in style information extracted from the input image. The style information extracted from the input image may be represented as Gram matrix $G_{i,j}$ of the feature map.

$$G_{i,j} = a_i^T a_j$$

The Gram matrix represented by G indicate a correlation between channels of the input feature map. The (i,j) element of G represents the correlation between the i-th and j-th feature channels. The Gram matrix of the input image may be calculated through $a_i$ that is a vector form of the i-th channel of the input feature map.

Figure 3:
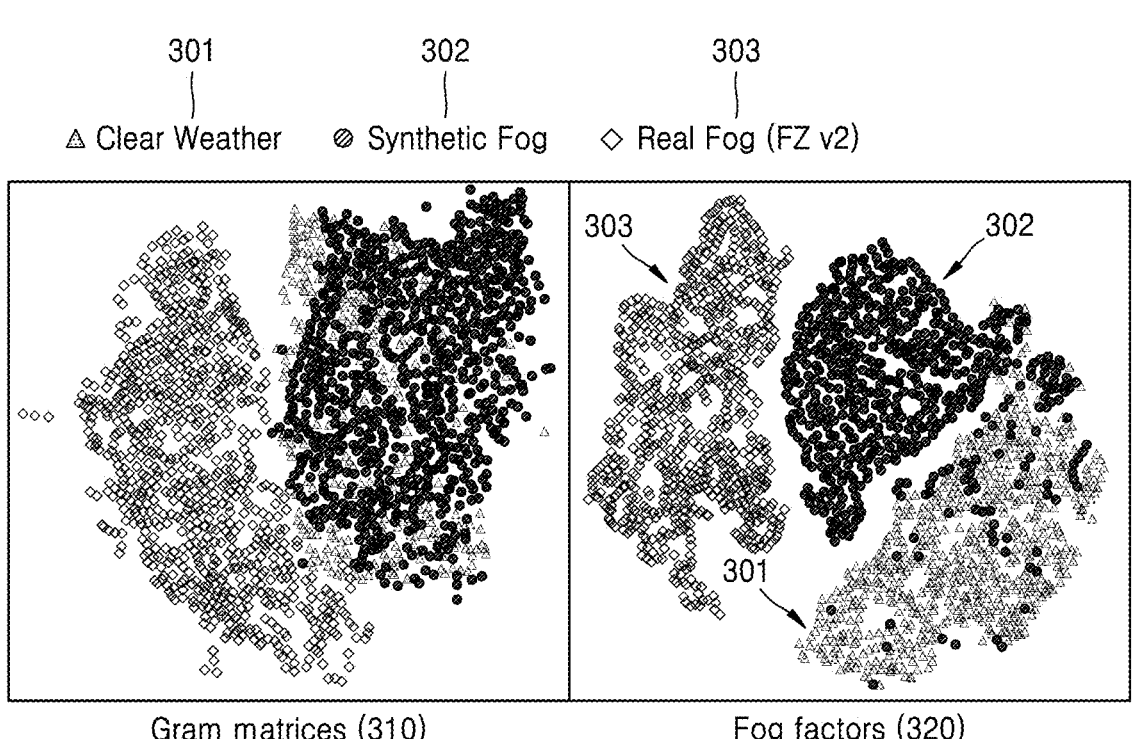
FIG. 3 illustrates an example in which, in an embodiment, a fog factor is separated from the Gram matrix of a feature map in a fog-pass filter.

FIG. 3 illustrates an example in which, in an embodiment, a fog factor 320 of $f^{CW}$ 301, $f^{SF}$ 302, and $f^{RF}$ 303 are separated from Gram matrix 310 of a feature map in a fog-pass filter.

The fog-pass filter 220a separates only an effect of fog in the style information as a fog factor. Through this method, the fog-pass filter 220a may identify the fog condition of an input image through the fog factor.

Equation 1 represents the loss function of a fog-pass filter. The loss function of a fog-pass filter is used to extract a fog factor by a fog-pass filter by receiving, as inputs, the Gram matrix of a feature map of a segmentation network.

$$\mathcal{L}_{F^l} = \sum_{(a,b)\in P} \{(1 - \mathbb{1}(a,b))[m - d(f^{a,l}, f^{b,l})]_+^2 + \qquad \text{[Equation 1]}$$

$$\mathbb{1}(a,b)[d(f^{a,l}, f^{b,l}) - m]_+^2\},$$

In Equation 1, $F^l$ denotes the fog-pass filter 220a connected to the I-th layer of the segmentation network 210a, Ia and Ib denote two images of a clear weather image, a synthetic fog image, and a real fog image, and $f^{a,l}$ and $f^{b,l}$ denote fog factors. The two fog factors are represented by $f^{a,l}=F^l(u^{a,l})$ and $f^{b,l}=F^l(u^{b,l})$, where and $u^{a,l}$ denote Gram matrices calculated by the l-th intermediate feature map. d(.) denotes a cosine distance, and m denotes a constant meaning a margin value. I(a,b) is a function that returns 1 when $I^a$ and $I^b$ are the same fog domain, otherwise returns 0.

Next, when training the segmentation network 210b (S240), the parameters of the fog-pass filter 220b are fixed. In this case, the parameter of the fog-pass filter 220b are not trained. Accordingly, when training the segmentation network 210b (S230), a fog style matching loss $\mathcal{L}_{fsm}$ in Equation 3 is transferred to only the segmentation network 210b (S222).

The segmentation network 210b is trained to reduce the style gap between the fog factors obtained from different fog domains through a segmentation loss $\mathcal{L}_{seg}$ of Equation 2 and the fog style matching loss $\mathcal{L}_{fsm}$ of Equation 3.

$$\mathcal{L}_{seg}(P, Y) = -\frac{1}{n}\sum_i\sum_j Y_{i,j}\log P_{i,j} \qquad \text{[Equation 2]}$$

In Equation 2, P and Y denote a predicted value and a correct answer, respectively, n denotes the number of pixels, and (i,j) denotes the position of a pixel in a clear weather image or a synthetic fog image. As the clear weather image or synthetic fog image already has a correct answer Y for image recognition, in the segmentation network 210b, the segmentation loss $\mathcal{L}_{seg}$ is trained to calculate the predicted value P close to the correct answer.

$$\mathcal{L}_{fsm}^l(f^{a,l}, f^{b,l}) = \frac{1}{4d_l^2 n_l^2}\sum_{i=1}^{d_l}(f_i^{a,l} - f_i^{b,l})^2 \qquad \text{[Equation 3]}$$

In Equation 3, $d_l$ and $n_l$ denote the dimension of a fog factor and the spatial size of the l-th feature map, respectively. The fog style matching loss of Equation 3 is a loss function that makes the fog conditions of training images obtained in different fog conditions to be undistinguishable.

When a pair of images Ia and Ib are given from among the clear weather domain $I^{CW}$ 201, the synthetic fog domain $I^{SR}$ 202, and the real fog domain $I^{RF}$ 203, the segmentation network 210b learns a fog-invariant feature by learning the fog style matching loss to close the distance between fog factors as in Equation 3. In the disclosure, CW denotes a clear weather, SR denotes a synthetic fog, and RF denotes a real fog.

The clear weather image and the synthetic fog image corresponding to the clear weather image have the same semantic layout. The segmentation network 210b learns a prediction consistency loss $\mathcal{L}_{con}$ of Equation 4 with respect to the clear weather image and the synthetic fog image corresponding to the clear weather image such that predicted values for all pixels I match each other.

$$\mathcal{L}_{con}(P^{CW}, P^{SF}) = \sum_i KLdiv(P_i^{CW}, P_i^{SF}), \qquad \text{[Equation 4]}$$

In Equation 4, KLdiv denotes Kullback-Leibler divergence, P denotes a predicted value, and CW and SF denote a clear weather and a synthesis fog domain, respectively.

The segmentation network 210b learns invariability for fog through an image pair sampled from each of three pairs of (clear weather image, synthetic fog image), (clear weather image, real fog image), and (real fog image, synthetic fog image).

In an embodiment, the segmentation network 210b is trained based on the segmentation loss $\mathcal{L}_{seg}$ that calculates a predicted value close to the correct answer, the fog style matching loss $\mathcal{L}_{fsm}$ that is calculated such that the fog conditions of the training images obtained in different fog conditions are undistinguishable, and the prediction consistency loss $\mathcal{L}_{con}$ that is calculated to derive similar inferred values for a training image pair having an image recognition correct answer.

In detail, the segmentation network 210b is trained such that Equation 5 is minimized through the pair of (clear weather image, synthetic fog image).

As the pair of (clear weather CW image, synthetic fog SF image) has the same semantic layout, in addition to the segmentation loss $\mathcal{L}_{seg}$ of Equation 2 and the fog style matching loss $\mathcal{L}_{fsm}$ of Equation 3, the prediction consistency loss $\mathcal{L}_{con}$ of Equation 4 is additionally applied for training.

$$\mathcal{L}_S^{CW-SF} = \mathcal{L}_{seg}(P^{CW}, Y^{CW}) + \mathcal{L}_{seg}(P^{SF}, Y^{SF}) + \qquad \text{[Equation 5]}$$

$$\lambda_{fsm}\sum_l \mathcal{L}_{fsm}^l(f^{CW,l}, f^{SF,l}) + \lambda_{con}\mathcal{L}_{con}(P^{CW}, P^{SF})$$

In Equation 5, $\lambda_{fsm}$ and $\lambda_{con}$ denote hyper-parameters for balancing, and YCW=YSF.

In another embodiment, the segmentation network 210b is trained based on, when one of the image pair is a real fog domain, the segmentation loss $\mathcal{L}_{seg}$ that calculates a predicted value close to the correct answer with respect to a domain selected from the clear weather domain and the synthetic fog domain, and the fog style matching loss $\mathcal{L}_{fsm}$ that is calculated such that fog conditions of a training image obtained from the selected domain and a training image obtained from the real fog domain are undistinguishable.

In detail, the segmentation network 210b is trained, as in Equation 6, for the pair of (clear weather CW image, real fog RF image) including real fog, and the pair of (real fog RF image, synthetic fog SF image).

$$\mathcal{L}_S^{D-RF} = \mathcal{L}_{seg}(P^D, Y^D) + \lambda_{fsm}\sum_l \mathcal{L}_{fsm}^l(f^{D,l}, f^{RF,l}) \qquad \text{[Equation 6]}$$

In Equation 6, D denotes a clear weather domain or a synthetic fog domain. As the real fog image has no separation label, the segmentation loss $\mathcal{L}_{seg}$ is not applied to the real fog image.

FIG. 4 is a flowchart of a method of learning a fog-invariant feature in a device for learning a fog-invariant feature, according to an embodiment.

An effect of fog on an input image is represented by a fog-pass filter as a fog factor (S410). A parameter of a segmentation network is fixed, the fog-pass filter is trained such that fog factors of the same fog domain approach each other and fog factors of different fog domains are apart from each other, and the fog condition of the input image is determined to be a fog factor (S420). Then, the parameter of the fog-pass filter is fixed, and the segmentation network is trained to gradually close a fog style gap between different fog domains (S430). The device for learning a fog-invariant feature learns a fog-invariant feature by alternately training a segmentation network and a fog-pass filter (fog-pass filter) by using three fog domains.

The apparatus described above may be implemented by a hardware constituent element, a software constituent element, and/or a combination of a hardware constituent element and a software constituent element. For example, the apparatus and constituent elements described in embodiments may be implemented by using one or more general purpose computers or special purpose computers, for example, processors, controllers, arithmetic logic units (ALUs), digital signal processors, microcomputers, field programmable gate arrays (FPGAs), programmable logic units (PLU), microprocessors, or any apparatus capable of executing and responding instructions. A processing device may execute an operating system (OS) and one or more software applications executed on the OS. Furthermore, the processing device may access, store, operate, process, and generate data, in response to the execution of software. For convenience of understanding, although one processing device is described as being used, one skilled in the art can know that the processing device may include a plurality of processing elements and/or a plurality of types of processing elements. For example, the processing device may include a plurality of processors or one processor and one controller. Furthermore, another processing configuration such as a parallel processor is possible.

The method according to an embodiment may be implemented in the form of program commands to be executed through various computer means and recorded in a computer-readable medium. The computer-readable medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes created by a compiler, but also high-level programming language executable by a computer using an interpreter.

In an embodiment, the method of learning a fog-invariant feature has an effect of learning a fog-invariant feature by alternately optimizing a segmentation network and a fog-pass filter.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A device for learning a fog-invariant feature, the device comprising:
at least one processor; and
memory storing instructions,
wherein the instructions, when executed by the at least one processor, cause the device to train a segmentation network by performing alternating training between a fog-pass filter and the segmentation network using three fog domain datasets, the alternating training comprising:
passing an input image to the segmentation network to:
generate, based on the input image, at least one intermediate feature map using at least one intermediate layer of the segmentation network; and
output, based on the at least one intermediate feature map, at least one predicted value indicating an image recognition result for a plurality of pixels in the input image;
passing the at least one intermediate feature map to the fog-pass filter to generate a fog factor indicating a fog condition of the input image;
training the fog-pass filter, based on the fog factor, such that fog factors of a same fog domain converge and fog factors of different fog domains diverge; and
training the segmentation network to learn the fog-invariant feature by fixing a parameter of the fog-pass filter and updating parameters of the segmentation network, based on the at least one predicted value and the fog factor, such that a fog style gap between the different fog domains decreases.

2. The device of claim 1, wherein fog domains of the three fog domain datasets respectively comprise a clear weather domain, a synthetic fog domain, and a real fog domain, wherein the clear weather domain and the synthetic fog domain are each labeled, and the real fog domain is unlabeled.

3. The device of claim 1, wherein a parameter of the segmentation network is fixed when training the fog-pass filter, and parameters of the fog-pass filter are fixed when training the segmentation network.

4. The device of claim 2, wherein the fog-pass filter receives as input a Gram matrix of the at least one intermediate feature map.

5. The device of claim 1, wherein the fog factor denotes a value that represents, in a real number vector, an effect of fog in style information extracted from the input image, and the style information extracted from the input image is represented as a Gram matrix of the at least one intermediate feature map.

6. The device of claim 4, wherein the Gram matrix of the at least one intermediate feature map comprises a Gram matrix of the clear weather domain, a Gram matrix of the synthetic fog domain, and a Gram matrix of the real fog domain.

7. The device of claim 1, wherein the segmentation network is trained, for a training image pair of (clear weather image, synthetic fog image), based on:

a split loss that calculates a predicted value close to a correct answer, a fog style matching loss that is calculated such that fog conditions of training images obtained in different fog conditions are undistinguishable, and a prediction consistency loss that is calculated to derive similar inferred values based on the training image pair having corresponding image recognition correct answers.

8. The device of claim 1, wherein the segmentation network is trained, for a training image pair of (clear weather image, real fog image) and a training image pair of (real fog image, synthetic fog image), based on a segmentation loss that calculates a predicted value close to a correct answer of a domain selected from among a clear weather domain and a synthetic fog domain, and a fog style matching loss that is calculated such that fog conditions of a training image obtained from the selected domain and a training image obtained from a real fog domain are undistinguishable.

9. A method of learning a fog-invariant feature by performing alternating training between a fog-pass filter and a segmentation network, the method comprising:

passing an input image to the segmentation network to:

generate, based on the input image, a Gram matrix of at least one intermediate feature map, using at least one intermediate layer of the segmentation network; and output, based on the at least one intermediate feature map, at least one predicted value indicating an image recognition result for a plurality of pixels in the input image;

passing the Gram matrix to the fog-pass filter to generate a fog factor indicating a fog condition of the input image;

training the fog-pass filter by fixing a parameter of the segmentation network and updating parameters of the fog-pass filter, based on the fog factor, such that fog factors of a same fog domain converge and fog factors of different fog domains diverge; and training the segmentation network to learn the fog-invariant feature by fixing a parameter of the fog-pass filter and updating parameters of the segmentation network, based on the at least one predicted value and the fog factor, such that a fog style gap between the different fog domains decreases.

10. The method of claim 9, wherein the segmentation network uses three fog domain datasets.

11. The method of claim 9, wherein style information extracted from the input image is represented by the Gram matrix of a feature map.

12. The method of claim 11, wherein the Gram matrix comprises a Gram matrix of a clear weather domain, a Gram matrix of a synthetic fog domain, and a Gram matrix of a real fog domain.

13. The method of claim 9, wherein the segmentation network is trained, for a training image pair of (clear weather image, synthetic fog image), based on a segmentation loss that calculates a predicted value close to a correct answer, a fog style matching loss that is calculated such that fog conditions of training images obtained in different fog conditions are undistinguishable, and a prediction consistency loss that is calculated to derive similar inferred values for a training image pair having an image recognition correct answer.

14. The method of claim 9, wherein the segmentation network is trained, for a training image pair of (clear weather image, real fog image) and a training image pair of (real fog image, synthetic fog image), based on a segmentation loss that calculates a predicted value close to a correct answer of a domain selected from among a clear weather domain and a synthetic fog domain, and a fog style matching loss that is calculated such that fog conditions of a training image obtained from the selected domain and a training image obtained from a real fog domain are undistinguishable.

15. The method of claim 9, wherein the segmentation network is trained based on a segmentation loss that calculates a predicted value close to a correct answer, and further trained based on at least one of a fog style matching loss that is calculated such that fog conditions of training images obtained in different fog conditions are undistinguishable, or a prediction consistency loss that is calculated to derive similar inferred values for a training image pair having an image recognition correct answer.

\* \* \* \* \*